US009850409B2

(12) United States Patent
Zhang et al.

(10) Patent No.: US 9,850,409 B2
(45) Date of Patent: Dec. 26, 2017

(54) HIGH TEMPERATURE DEBONDABLE ADHESIVE

(71) Applicants: Henkel IP & Holding GmbH, Duesseldorf (DE); Henkel AG & Co. KGaA, Duesseldorf (DE); Henkel (China) Investment Co. Ltd., Shanghai (CN)

(72) Inventors: Wenhua Zhang, Farmington, CT (US); Xiaoyan Huang, Hillsborough, NJ (US); Shengqian Kong, Hillsborough, NJ (US); Xiao Allison Yue, Belle Mead, NJ (US); Stephen Hynes, Dublin (IE); Jiangbo Ouyang, Clarksburg, MD (US); Chunyu Sun, Shanghai (CN)

(73) Assignees: Henkel AG & Co. KGaA, Duesseldorf (DE); Henkel IP & Holding GmbH, Duesseldorf (DE)

(*) Notice: Subject to any disclaimer, the term of this patent is extended or adjusted under 35 U.S.C. 154(b) by 0 days.

(21) Appl. No.: 14/940,291

(22) Filed: Nov. 13, 2015

(65) Prior Publication Data
US 2016/0068720 A1    Mar. 10, 2016

Related U.S. Application Data

(63) Continuation of application No. PCT/CN2013/078759, filed on Jul. 3, 2013.

(51) Int. Cl.
| | |
|---|---|
| *C08F 2/46* | (2006.01) |
| *C08F 2/50* | (2006.01) |
| *C08G 61/04* | (2006.01) |
| *C09J 143/04* | (2006.01) |
| *C09J 5/06* | (2006.01) |
| *C09J 183/04* | (2006.01) |
| *B32B 7/06* | (2006.01) |
| *B32B 7/12* | (2006.01) |
| *B32B 37/12* | (2006.01) |
| *B32B 38/10* | (2006.01) |
| *C08G 77/12* | (2006.01) |
| *C08G 77/20* | (2006.01) |
| *C08G 77/04* | (2006.01) |
| *C08G 77/50* | (2006.01) |

(52) U.S. Cl.
CPC ............ *C09J 143/04* (2013.01); *B32B 7/06* (2013.01); *B32B 7/12* (2013.01); *B32B 37/1207* (2013.01); *B32B 38/10* (2013.01); *C09J 5/06* (2013.01); *C09J 183/04* (2013.01); *B32B 2255/26* (2013.01); *C08G 77/045* (2013.01); *C08G 77/12* (2013.01); *C08G 77/20* (2013.01); *C08G 77/50* (2013.01); *C08L 2312/06* (2013.01); *C09J 2205/302* (2013.01); *C09J 2205/31* (2013.01); *C09J 2483/00* (2013.01)

(58) Field of Classification Search
CPC . C09J 143/04; C09J 5/06; C09J 183/04; C09J 2205/31; C09J 2205/302; C09J 2483/00; B32B 37/1207; B32B 7/12; B32B 2255/26; B32B 38/10; B32B 7/06; C08K 5/56; C08K 5/5419; C08L 83/00; C08L 2312/06; C08G 77/045; C08G 77/20; C08G 77/50
USPC ................ 522/33, 6, 71, 189, 184, 1; 520/1
See application file for complete search history.

(56) References Cited

U.S. PATENT DOCUMENTS

| | | | |
|---|---|---|---|
| 4,565,714 A | 1/1986 | Koshar | |
| 4,908,086 A | 3/1990 | Goodrich et al. | |
| 5,169,727 A * | 12/1992 | Boardman | C09J 183/04 428/447 |
| 5,256,717 A | 10/1993 | Stauffer et al. | |
| 5,278,276 A | 1/1994 | Ohta et al. | |
| 5,328,965 A | 7/1994 | Mikami et al. | |
| 5,466,532 A * | 11/1995 | Wengrovius | C09J 183/04 428/447 |
| 5,596,025 A * | 1/1997 | Oxman | A61K 6/10 523/109 |
| 6,300,426 B1 * | 10/2001 | Koyama | C09D 183/04 525/477 |
| 6,949,306 B2 | 9/2005 | Anhorn et al. | |
| 8,092,628 B2 | 1/2012 | Hong et al. | |
| 8,399,592 B2 | 3/2013 | Manabe et al. | |
| 2003/0068442 A1 * | 4/2003 | Tully | C09D 183/06 427/393.2 |
| 2004/0053059 A1 * | 3/2004 | Mistele | C08L 83/04 428/447 |
| 2010/0292362 A1 * | 11/2010 | Zech | A61K 6/083 523/109 |
| 2010/0316845 A1 | 12/2010 | Rule et al. | |
| 2011/0318938 A1 | 12/2011 | Takeuchi et al. | |
| 2012/0157624 A1 * | 6/2012 | Saito | C08G 77/12 524/852 |

FOREIGN PATENT DOCUMENTS

| | | |
|---|---|---|
| EP | 235294 | 9/1987 |
| WO | 0040648 | 7/2000 |
| WO | 0214451 | 2/2002 |
| WO | 2008133138 | 11/2008 |

* cited by examiner

OTHER PUBLICATIONS

International Search Report issued in connection with International Patent Application No. PCT/CN2013/078759 dated Apr. 22, 2014.

*Primary Examiner* — Jessica E Whiteley
(74) *Attorney, Agent, or Firm* — Steven C. Bauman

(57) ABSTRACT

A debondable adhesive composition comprising (A) the hydrosilation reaction product of the reaction between the vinyl groups on 1,3,5,7-tetravinyl-1,3,5,7-tetramethylcyclotetrasiloxane and the terminal Si—H hydrogens on a silane or siloxane having terminal Si—H hydrogens, (B) a crosslinker for the hydrosilation reaction product, and (C) a metal catalyst and/or a radical initiator is provided.

15 Claims, No Drawings

HIGH TEMPERATURE DEBONDABLE ADHESIVE

FIELD OF THE INVENTION

This invention relates to curable temporary adhesives for use in high temperature applications, and particularly to adhesives for the temporary attachment of one substrate to another substrate.

BACKGROUND

Within a number of industries, there is growing interest in the use of flexible and/or very thin substrates, for example, stainless steel, silicon wafers, glass, ceramic, polyimide and polyester films. Flexible and very thin substrates are too fragile to be handled freestanding in downstream manufacturing conditions, and must be supported on a suitable carrier to survive. After the fabrication processes are done, the substrate must be removable from the carrier undamaged, preferably at ambient temperature.

In the electronics industry, as one example, imaging displays, sensors, photovoltaics and RFIDs, increasingly require thin and/or flexible substrates for display applications for cell phones, personal digital assistants, iPADs, or TVs. An exemplary substrate is a very thin (100 μm) glass packed with functionalities. The glass is processed at 400° C. to depose thin film transistors (TFT) or at 350° C. to deposit indium tin oxide (ITO) as a transparent conductor. Due to the fragility of the glass and the harsh process conditions, this glass must be reinforced or protected by a more stable substrate during fabrication.

Uses such as this call for a high temperature stable adhesive that is easily and cleanly debondable, that permits temporary bonding at high processing temperatures, and that does not compromise handling or performance of the substrates. This is a drive particularly within the electronics industry. Development of such adhesives would allow existing fabrication methods, such as for semiconductors, active matrix thin film transistors, touch membranes, or photovoltaics, to use the currently installed base of manufacturing tools and machines. Most currently available temporary adhesives are not thermally stable at the maximum processing of the manufacturing steps, which can be as high as 400° C.

Adhesives suitable for high temperature temporary bonding applications, which can later be removed at room temperature without causing damage to the target component, would advance the use of thinner or more flexible substrates across various industries.

SUMMARY OF THE INVENTION

As used within this specification and the claims, "substrate" refers to the target component for the fabrication processes, and "carrier" refers to the support structure for the "substrate".

This invention is a adhesive composition comprising (A) the hydrosilation reaction product of the reaction between the vinyl groups on 1,3,5,7-tetravinyl-1,3,5,7-tetramethyl-cyclotetrasiloxane and the terminal Si—H hydrogens on a silane or siloxane having terminal Si—H hydrogens, (B) a cross-linker for the hydrosilation reaction product, and (C) a metal catalyst and/or radical initiator.

The hydrosilation reaction product (A) of the reaction between 1,3,5,7-tetravinyl-1,3,5,7-tetramethyl-cyclotetrasiloxane and a silane or siloxane having terminal Si—H hydrogens will be referred to within this specification as a vinylcarbosiloxane or a VCS resin or a VCSR.

The cross-linker (B) is a siloxane that reacts in a vinyl addition reaction with the vinyl groups on the VCSR. The catalyst will be a metal catalyst and/or a radical initiator, and the cure will be a thermal or photo cure. Suitable metal catalysts include commercially available platinum and rhodium catalysts. Suitable radical initiators are many and are known to those skilled in the art; one such radical initiator is dicumene peroxide. Suitable radical initiators also include photoinitiators, such as those sold under the tradenames DAROCURE 1173 and IRGACURE 184 or 2100.

The adhesive composition maintains its adhesion at temperatures of 300° C. or greater, up to 440° C., and is mechanically debondable at room temperature at a force 5N/25 mm or less, in some embodiments at a force of 3N/25 mm or less, and in some embodiments at a force of 2N/25 mm or less.

In another embodiment, this invention is an assembly of a substrate and carrier, in which the adhesive composition is disposed between the substrates.

In a further embodiment, this invention is a method of debonding a substrate from a carrier comprising: (a) providing a substrate and a carrier, (b) disposing a debondable adhesive on the substrate and/or the carrier, (c) contacting the substrate and carrier so that the debondable adhesive is disposed between, forming an assembly, (d) heating the assembly at a temperature or range of temperatures to adhere the substrates, or (e) exposing the assembly to radiation to adhere the substrates, or (f) exposing the assembly to radiation followed by thermal heating to adhere the substrates, and (g) allowing the assembly to come to ambient temperature and mechanically separating the substrates.

When step (d) is used, heating will be applied at a temperature or range of temperatures with the temperature range of 100° C. to 175° C. for 1 to 30 minutes. When step (e) is used, UV radiation can be applied using a 400 Watt lamp for about 1 to 4 minutes; other sources of radiation may also be used within the discretion of the practitioner. When step (f) is used, a combination of the parameters for steps (d) and (e) will be used to obtain the desired cure; suitable cure conditions can be determined by one skilled in the art without undue experimentation knowing the parameters of steps (d) and (e).

DETAILED DESCRIPTION OF THE INVENTION

The adhesive of this invention has been developed to provide adequate temporary adhesion of substrates to carriers at fabrication temperatures ranging from 300° C. up to 450° C., and to debond with adhesive failure at the interface of the substrate and carrier at ambient temperature without damaging the substrate.

Component (A), a VCSR, is the hydrosilation reaction product of the reaction between the vinyl groups on 1,3,5, 7-tetravinyl-1,3,5,7-tetramethylcyclotetrasiloxane and the terminal Si—H hydrogens on a silane or siloxane having terminal Si—H hydrogens. 1,3,5,7-Tetravinyl-1,3,5,7-tetramethylcyclotetrasiloxane, has the structure:

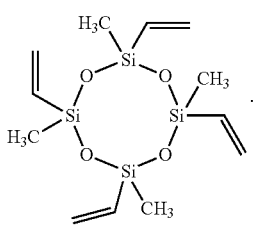

Suitable silanes or siloxanes having at least two terminal Si—H hydrogens for reacting with the 1,3,5,7-tetravinyl-1,3,5,7-tetramethylcyclotetrasiloxane include those having the structures:

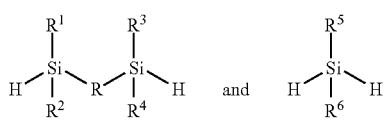

in which R is selected from the group consisting of a $C_1$ to $C_{10}$ alkyl group, an aryl group, an oxygen, —(O—SiMe$_2$)$_n$—O—, —(O—SiAr$_2$)$_n$—O—, —(O—SiMeAr)$_n$—O—, and a combination of any of these groups, in which n is at least the numeral one, Me is a methyl group, and Ar is an aryl group; and in which each of $R^1$, $R^2$, $R^3$, $R^4$, $R^5$, and $R^6$, independently is a $C_1$ to $C_{10}$ alkyl group or an aryl group.

Exemplary silanes or siloxanes include polyalkylsilanes and polyalkyl-siloxanes in which the alkyl groups on the silicon atoms are $C_1$ to $C_{10}$ alkyl groups. In various embodiments, the silanes and siloxanes include polydimethylsiloxane, polymethylphenyl siloxane, and tetramethyldisiloxane. These compounds are commercially available from Gelest.

Preferred VCSR reaction products (A) are those having the following idealized structures, in which the molecular weight is weight averaged molecular weight. In various embodiments, the alkyl groups on the silicon atoms of the VCSR reaction products include $C_1$ to $C_{10}$ alkyl groups. In the following idealized structures, methyl groups are depicted, but it should be understood that other $C_1$ to $C_{10}$ alkyl groups can be substituted.

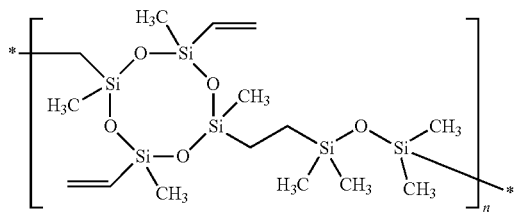

VCSR-1, Mw = 1000 - 100,000

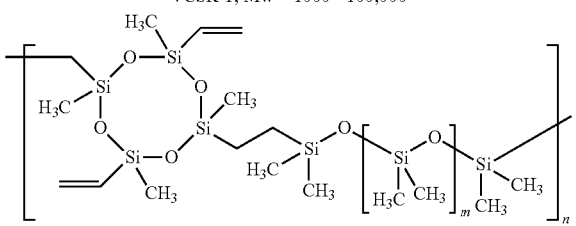

VCSR-2, Mw = 1000 - 150,000

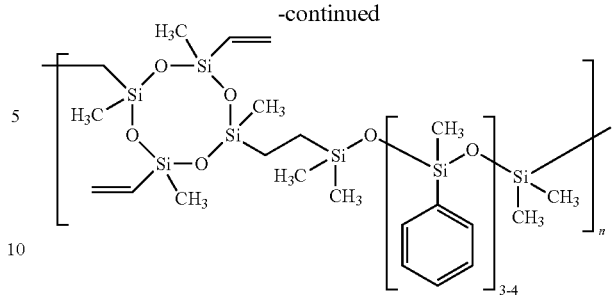

VCSR-3, Mw = 1000 - 100,000

Component (B) of the adhesive composition is a cross-linker for the hydrosilation reaction product (A), and in various embodiments will contain $C_1$ to $C_{10}$ alkyl groups on the silicon atom. In particular embodiments, suitable cross-linking compounds (B) for use in a cross-linking hydrosilation reaction with the vinylcarbosiloxane reaction product (A) include poly(methylhydro)siloxane, methylhydro-siloxane-dimethylsiloxane copolymer, dimethylsilylphenyl ether, polymethylphenylsiloxane, and poly(methylhydro) phenyl siloxane. These compounds are available commercially from Gelest.

In some embodiments, a chain extender can be used to extend the Si—H crosslinker compounds (B) and increase the molecular weight of the adhesive. Suitable chain extenders are selected from am-vinyl terminated linear polysiloxanes, divinyl silanes, and divinyl siloxanes. In various embodiments, the alkyl groups on the silicon atoms will be $C_1$ to $C_{10}$ alkyl groups. In a particular embodiment, the chain extender is divinyltetramethyldisiloxane.

When chain extenders are used in the reaction blend to extend a cross-linking silane or siloxane, the molar equivalent ratio between component (A) and component (B) is calculated on the available moles of 1,3,5,7-tetravinyl-1,3,5,7-tetramethylcyclo-tetrasiloxane and cross-linker after the chain extension.

Component (C) of the adhesive composition is a metal catalyst and/or a radical initiator. When optical clarity is desired, a suitable catalyst is a liquid platinum catalyst used at a level to be 20 ppm or less in the final resin mixture. Higher levels can cause yellowing, but can be used as needed when it is not required to avoid yellowing. In many reactions, the level of catalyst can still be active and yet be low enough so that it is not necessary to separate it from the reaction product.

Curable temporary adhesives are prepared from the vinylcarbosiloxane reaction product (A) and the chosen cross-linking compound (B) in a molar equivalent ratio of 6-0.6:1 in the presence of a metal catalyst and/or a radical initiator.

Examples

Two preferred properties for these debondable adhesives are that they are stable and maintain their integrity at temperatures at 300° C. and above, to as high as 440° C., and that they easily and cleanly debond at ambient temperature. In the following examples, visual evidence of fine line cracking at high temperature indicates instability, and evidence of peel strength higher than 5N/25 mm indicates that the adhesive can not be cleanly removed.

The test vehicle was an assembly of two glass slides 5 cm×7.5 cm, from VWR international with the adhesive composition deposed between the two slides. The bondline thickness for all samples, unless otherwise stated, was 0.125 mm. The assemblies were placed on a 150° C. Cole Parmer Digital hotplate for 30 minutes in air to harden the adhesive.

To test high temperature stability, a Thermo Scientific BF5800 Furnace was used to heat the assemblies to determined temperatures. When visual inspection of the adhesive after heating revealed fine lines or cracks, the adhesive was determined to be unstable.

Weight loss of the adhesive in test vehicles was used as another measure of stability. The lower the weight loss, the more stable the adhesive. Samples were weighed before and after heating for one hour at 400° C. using a Thermogravimetric Analyzer (TGA), Pyris 1 from Perkin Elmer and the weight loss calculated. A weight loss of less than 9.6% is deemed acceptable and the adhesive deemed stable. In one embodiment, a preferred weight loss is 7.3% or less.

In examples where UV was used as the curing method, a Dymax EC series 450 W UV lamp was used to irradiate the test vehicles for a specific time.

Debonding tests were performed using a Shimpo FGV-20XY digital force gauge: the top glass slide of the test vehicle was peeled off the stabilized bottom glass slide and the peel force (deemed the debonding force) calculated and normalized to N/25 mm.

The materials used in the examples were the following:

| | |
|---|---|
| AEROSIL R972 | fumed silica (Evonik Degussa Corporation) |
| ECCOCOAT SC3613 | epoxy encapsulant (Henkel Corp) |
| DAROCURE 1173 | acetophenone-type photoinitiator (Ciba) |
| HMS 301R | methylhydrosiloxane-dimethylsiloxane coploymers, trimethylsiloxy terminated (Gelest) |
| PDV | vinyl terminated diphenylsiloxane-dimethylsiloxane copolymer (Gelest) |
| Pt (IV) | trimethyl(methylcyclopentadienyl) platinum complex (Sigma-Aldrich) |
| RMS-044 | (methacryloxypropyl)methylsiloxane - dimethylsiloxane copolymer with 4-6 mole % of (methacryloxypropyl)-methylsiloxane, viscosity 8,000-10,000 cps (Gelest) |
| RMS-083 | (methacryloxypropyl)methylsiloxane-dimethylsiloxane copolymer with 7-9 mole % of (methacryloxypropyl)-methylsiloxane, viscosity 2,000-3,000 cps (Gelest) |
| SIB 1086.0 | 1,4-bis(dimethylsilyl)benzene (Gelest) |
| SIB 1090 | bis(p-dimethylsilyl)phenyl)ether (Gelest) |
| SIH 6117.0 | 1,1,3,3,5,5-hexamethyltrisiloxane (Gelest) |
| SIM 6582.0 | methyltris(dimethylsiloxy)silane (Gelest) |
| SIP 6742.5 | 3-phenyl-1,1,3,5,5-pentamethyltrisiloxane (Gelest) |
| SIP 6826.0 | phenyl tris(dimenthylsiloxy)silane (Gelest) |
| SIP 6830.3 | platinum-divinyltetramethyldisiloxane complex (Gelest) |
| SIT 7530.0 | 1,3,5,7 tetramethylcyclotetrasiloxane (Gelest) |
| SYLGUARD 184 | silicone encapsulant (Dow Corning) |
| UMS-182 | (acryloxypropyl)methylsiloxane - dimethylsiloxane copolymer with 15-20 mole % of (acryloxypropyl)-methylsiloxane, viscosity 80-120 cps (Gelest) |
| VCSR | vinylcarbosiloxanes, synthesized in-house |

Except for those samples based on SYLGUARD 184 and ECCOCOAT SC3613 resins, which are comparative examples, all other examples below contain about 20 ppm of platinum catalyst from the SIP 6830.3 platinum complex.

Formulations for the examples and the test results are reported in the following tables and show that the component (A) to component (B) molar equivalent ratio has an effect on the creation of high temperature stable adhesives.

Adhesive compositions in examples 1 to 24 were prepared to contain as component (A) VCSR-2 and as component (B) various crosslinkers. Each test vehicle was heated at 300° C. for 30 minutes and then examined visually for fine lines or cracks. Any visual evidence of fine lines or cracks was deemed a failure of the adhesive composition. The results are reported in TABLE 1 and show that an effective VCSR to crosslinker ratio for creating effective high temperature adhesives is within the range from 6-0.6:1.

Some examples show good performance outside this ratio range. It was found, however, that small changes in the reaction conditions at the ratios at the ends of the 6-0.6:1 molar equivalent ratio range caused differences in properties affecting the stability of the adhesive. Therefore, the preferred molar equivalent ratio range is in the middle of the wider range of acceptable performance. Consequently, it can be understood that some individual samples that fall out of the stated range of 6-0.6:1 may still give good stability performance.

(Samples are not always reported in numerical order.)

TABLE 1

STABILITY PERFORMANCE

| Ex. | (A) | (B) | Mole ratio (A):(B) | Result |
|---|---|---|---|---|
| 1 | VCSR-2 | HMS-301R | 13.60 | Fail |
| 2 | VCSR-2 | HMS-301R | 8.24 | Pass |
| 3 | VCSR-2 | HMS-301R | 1.67 | Pass |
| 4 | VCSR-2 | HMS-301R | 0.48 | Pass |
| 5 | VCSR-2 | HMS-301R | 0.18 | Pass |
| 6 | VCSR-2 | HMS-301R | 0.08 | Fail |
| 7 | VCSR-2 | SIB 1090 | 13.62 | Pass |
| 8 | VCSR-2 | SIB 1090 | 6.03 | Pass |
| 9 | VCSR-2 | SIB 1090 | 3.76 | Pass |
| 10 | VCSR-2 | SIB 1090 | 1.26 | Pass |
| 11 | VCSR-2 | SIB 1090 | 0.51 | Pass |
| 12 | VCSR-2 | SIB 1090 | 0.47 | Fail |
| 13 | VCSR-2 | SIB 1090 | 0.34 | Fail |
| 14 | VCSR-2 | SIP 6826.0 | 6.12 | Pass |
| 15 | VCSR-2 | SIP 6826.0 | 2.89 | Pass |
| 16 | VCSR-2 | SIP 6826.0 | 0.97 | Pass |
| 17 | VCSR-2 | SIP 6826.0 | 0.60 | Pass |
| 18 | VCSR-2 | SIP 6826.0 | 0.48 | Fail |
| 19 | VCSR-2 | SIB1086.0 | 1.61 | Pass |
| 20 | VCSR-2 | SIP 6742.5 | 1.58 | Pass |
| 21 | VCSR-2 | SIH 6117.0 | 1.22 | Pass |
| 22 | VCSR-2 | SIT 7530.0 | 1.58 | Pass |
| 23 | VCSR-2 | SIM 6582.0 | 1.48 | Pass |
| 24 | VCSR-2 | HMS-992 | 0.57 | Fail |
| 34 | VCSR-3 | SIP 6826.0 | 1.51 | Pass |

Adhesive compositions in Examples 25 and 26 contained as component (A), VCSR-2, and as component (B), SIB1090.0 crosslinker. The compositions also contained AEROSIL R972 fumed silica as filler. The bondline thickness was 0.125 mm. Each test vehicle was heated at 300° C. for 30 minutes and then examined visually for fine lines or cracks. Any visual evidence of fine lines or cracks was deemed a failure of the adhesive composition. The results are reported in TABLE 2 and show that fillers can be used in the formulations without loss of high temperature performance.

TABLE 2

STABILITY PERFORMANCE

| Ex. | (A) | (B) | Mole Ratio (A):(B) | Filler | Results |
|---|---|---|---|---|---|
| 25 | VCSR-2 | SIB 1090.0 | 2.24 | 5 wt % | Pass |
| 26 | VCSR-2 | SIB 1090.0 | 1.57 | 10 wt % | Pass |

Adhesive compositions in examples 27 and 28 contained as component (A), VCSR-2, and as component (B), a combination of two crosslinkers as noted in TABLE 3. Example 27 contained SIB1090.0 and HMS-301R crosslinkers, and example 28 contained SIP 6826.0 and PDV-0535 crosslinkers. The bondline thickness was 0.150 mm. Each test vehicle was heated at 300° C. for 30 minutes and then examined visually for fine lines or cracks. Any visual evidence of fine lines or cracks was deemed a failure of the adhesive composition. Molar equivalent ratio is given for the total (B) components. Example 30 was heated by UV radiation under a 400 W UV lamp for four minutes, at a total UV energy of 8 W/cm$^2$ using the Pt (IV) catalyst. The results are reported in TABLE 3.

TABLE 3

STABILITY PERFORMANCE

| Ex. | (A) | (B) | (B) | Mole Ratio (A):(B) | Results |
|---|---|---|---|---|---|
| 27 | VCSR-2 | SIB1090.0 | HMS-301R | 1.87 | Pass |
| 28 | VCSR-2 | SIP 6826.0 | PDV-0535 | 1.51 | Pass |
| 30* | VCSR-2 | SIB1090.0 | HMS-301R | 1.87 | Pass |

*This sample was exposed to UV using a 400 W lamp for 4 minutes for a total of 8 W/cm$^2$, using 200 ppm of Pt(IV) catalyst.

Examples 27, 28, 29, and 33 were tested for performance at high temperature and low bondline thickness. The heating conditions of temperature in ° C. and time in minutes, the bondline thickness in mm, and the performance results are reported in TABLE 4 and show the importance of the molar ratio.

TABLE 4

STABILITY PERFORMANCE

| Ex. | (A) | (B) | (B) | Mole Ratio (A):(B) | 350° C. 10 mins 0.15 mm | 400° C. 30 mins 0.03 mm | 440° C. 10 mins 0.03 mm |
|---|---|---|---|---|---|---|---|
| 27 | VCSR-2 | SIB1090.0 | HMS-301R | 1.87 | Pass | Pass | not measured |
| 28 | VCSR-2 | SIP 6826.0 | PDV-0535 | 1.51 | Pass | Pass | not measured |
| 29 | VCSR-2 | HMS-064 | | 6.45 | not measured | not measured | Pass |
| 33 | VCSR-1 | HQM-107 | | 3.52 | Pass * | not measured | not measured |

* Bondline for this sample was 0.03 mm

The Examples in TABLE 5 were further tested for weight loss using TGA and for debonding force as described above. The test conditions and results are reported in TABLE 5 and show acceptable weight stability and low bonding force which leads to easy removability.

TABLE 5

| Ex. | TGA weight loss after 350° C. for 30 minutes under N$_2$ | TGA weight loss after 400° C. for 60 minutes under N$_2$ | Debonding force N/25 mm |
|---|---|---|---|
| 3 | 1.6% | 3.2% | 1.2 |
| 4 | not measured | 5.7% | 0.8 |
| 5 | not measured | 7.3% | 1.2 |
| 9 | not measured | 6.3% | 2.3 |
| 10 | not measured | 3.2% | not measured |
| 16 | not measured | 4.2% | 1.4 |
| 25 | not measured | 3.0% | 2.2 |
| 26 | not measured | 2.9% | 2.1 |
| 27 | not measured | 3.7% | 2 |
| 28 | not measured | 3.0% | 1.2 |
| 34 | not measured | 3.3% | 1.6 |

Examples 31 and 32 are comparative examples using commercially available silicone products. Compositions prepared from these materials can survive 300° C. for 30 minutes, but show cracking at higher temperatures and cannot be debonded using a force of 5N/25 mm or less. They do not have thermal stability at 350° C. or higher because of unacceptable weight loss as measured by TGA. The heating conditions of temperature in ° C. and time in minutes, the bondline thickness in mm, and the performance results are reported in TABLE 6.

TABLE 6

| Ex. | Adhesive resin | 300° C. 30 mins 0.125 mm | 350° C. 10 mins 0.125 mm | 400° C. 30 mins 0.03 mm | Debondable after 300° C. 30 mins 0.125 mm | TGA weight loss after 400° C. for 60 minutes under $N_2$ |
|---|---|---|---|---|---|---|
| 31 | ECCOCOAT SC3613 resin | Pass | Fail | Fail | Fail | 9.6% |
| 32 | SYLGUARD 184 resin | Pass | Fail | Fail | Fail | 12.3% |

Examples 35 to 38 were prepared from the same components as example 27, with the further addition of Darocure1173 photoinitiator. Curing was accomplished using UVAloc 1000 at approximately 120 mW/cm² for 120 seconds. After irradiation curing, the samples were thermally cured at 150° C. for 15 minutes, and then aged at 350° C. for 30 minutes. Debonding force was tested as peel strength and TGA measured. The results are reported in TABLE 7 and indicate that the adhesive is stable and can be cleanly removed.

TABLE 7

| EX. | % wt DAROCURE1173 | Debonding Force N/25 mm | TGA Weight Loss |
|---|---|---|---|
| 35 | 0% | | 3.5% |
| 36 | 0.2% | 2.5N/25 mm | 3.0% |
| 37 | 0.5% | 1.8N/25 mm | 2.8% |
| 38 | 0.75% | 1.9N/25 mm | not measured |

Examples 39 to 41 were prepared from 89 wt % of the same components as example 27, 1 wt % of DAROCURE 1173 photoinitiator, and 10 wt % of an additional acrylated or methacrylated siloxane resin. Examples 42 to 44 were prepared from 89 wt % of the same components as example 28, 1 wt % of DAROCURE 1173 photoinitiator, and 10 wt % of an additional acrylated or methacrylated siloxane resin. Curing was accomplished using UVAloc 1000 at approximately 120 mW/cm² and the curing time needed for the glass slides of the test vehicle to be immovable manually was measured. This time was 30 seconds for all six examples. Debonding force, measured as peel strength, was calculated and normalized to N/25 mm. The debonding force and the specific additional acrylated or methacrylated siloxane resin added at 10 wt % are reported in TABLE 8.

TABLE 8

| EX. | Original example plus acrylated or methacrylated siloxane | Debonding Force N/25 mm |
|---|---|---|
| 39 | Ex 27 + UMS-182 | 1.7 |
| 40 | Ex 27 + RMS-044 | 1.4 |
| 41 | Ex 27 + RMS-083 | 2.0 |
| 42 | Ex 28 + UMS-182 | 1.2 |
| 43 | Ex 28 + RMS-044 | 1.6 |
| 44 | Ex 28 + RMS-083 | 1.2 |

These results indicate that the addition of a photoinitiator and an additional acrylated and/or methacrylated siloxane resin serves to set or fix the adhesive faster, allowing for a faster overall manufacturing process.

What is claimed:

1. A curable, debondable adhesive composition comprising
   (A) an adduct of 1,3,5,7-tetravinyl-1,3,5,7-tetramethylcyclotetrasiloxane and Si—H-terminated silane or siloxane,
   (B) a crosslinker for the adduct of (A), wherein the crosslinker is selected from the group consisting of poly(methylhydro)siloxane, methylhydrosiloxane-dimethylsiloxane copolymer, dimethylsilylphenyl ether, polymethylphenylsiloxane, and poly(methylhydro) phenyl siloxane and
   (C) a metal catalyst and/or radical initiator.

2. The debondable adhesive according to claim 1 in which the Si—H-terminated silane or siloxane has the structure

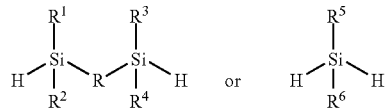

in which R is selected from the group consisting of a $C_1$ to $C_{10}$ alkyl group, an aryl group, an oxygen, —(O—SiMe$_2$)$_n$—O—, —(O—SiAr$_2$)$_n$—O—, —(O—SiMeAr)$_n$—O—, and a combination of any of these groups, in which n is at least one, Me is a methyl group, and Ar is an aryl group; and in which each of $R^1$, $R^2$, $R^3$, $R^4$, $R^5$, and $R^6$, independently is a $C_1$ to $C_{10}$ alkyl group or an aryl group.

3. The debondable adhesive according to claim 2 in which the Si—H-terminated silane or siloxane is selected from the group consisting of polydimethylsiloxane, polymethylphenyl siloxane, and tetramethyldisiloxane.

4. The debondable adhesive of claim 1 in which the radical initiator is a photoinitiator.

5. The debondable adhesive of claim 1 in which the molar equivalent ratio of the (A) adduct to (B) crosslinker ranges from 6-0.6:1.

6. The debondable adhesive of claim 1 further comprising an acrylated and/or methacrylated polysiloxane.

7. An assembly of a substrate and a carrier, and a debondable adhesive composition disposed between, in which the debondable adhesive comprises
   (A) an adduct of 1,3,5,7-tetravinyl-1,3,5,7-tetramethylcyclotetrasiloxane and Si—H-terminated silane or siloxane,
   (B) a cross-linker for the hydrosilation reaction product, and
   (C) a metal catalyst or radical initiator.

8. The assembly of claim 7 in which the silane or siloxane having terminal Si—H hydrogens of (A) has the structure

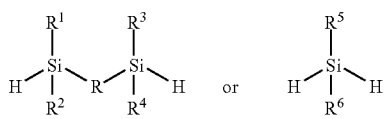

in which R is selected from the group consisting of a $C_1$ to $C_{10}$ alkyl group, an aryl group, an oxygen, —(O—SiMe$_2$)$_n$—O—, —(O—SiAr$_2$)$_n$—O—, —(O—SiMeAr)$_n$—O—, and a combination of any of these groups, in which n is at least the numeral one, Me is a methyl group, and Ar is an aryl group; and in which each of $R^1$, $R^2$, $R^3$, $R^4$, $R^5$, and $R^6$, independently is a $C_1$ to $C_{10}$ alkyl group or an aryl group.

9. The assembly of claim 8 in which the silane or siloxane having terminal Si—H hydrogens is selected from the group consisting of polydimethylsiloxane, polymethylphenyl siloxane, and tetramethyldisiloxane.

10. The assembly of claim 7 in which the crosslinker (B) for the hydrosilation product (A) is selected from the group consisting of poly(methylhydro)siloxane, methylhydrosiloxane-dimethylsiloxane copolymer, dimethylsilylphenyl ether, polymethylphenylsiloxane, and poly(methylhydro)phenyl siloxane.

11. The assembly of claim 7 in which the radical initiator in the debondable adhesive is a photoinitiator.

12. The assembly of claim 7 in which the molar equivalent ratio of the (A) hydrosilation reaction product to (B) crosslinker ranges from 6-0.6:1.

13. The assembly of claim 7 in which the debondable adhesive further comprises an acrylated and/or methacrylated polysiloxane.

14. A method for debonding a substrate from a carrier comprising:
(A) providing a substrate and a carrier,
(B) disposing the debondable adhesive of claim 1 on the substrate and/or the carrier,
(C) contacting the substrate and carrier so that the debondable adhesive is disposed between, forming an assembly,
(D) heating the assembly at a temperature or range of temperatures to adhere the substrates, or
(E) exposing the assembly to radiation to adhere the substrates, or
(F) exposing the assembly to radiation followed by heating to adhere the substrates, and
(G) allowing the assembly to come to ambient temperature and mechanically separating the substrates.

15. The debondable adhesive of claim 1, wherein the adduct is a member selected from the group consisting of:

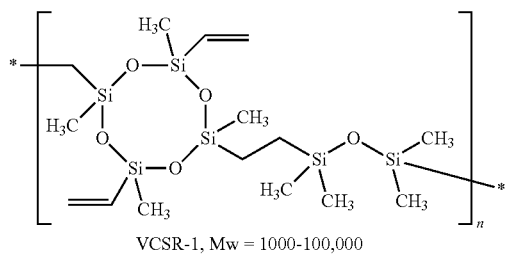

VCSR-1, Mw = 1000-100,000

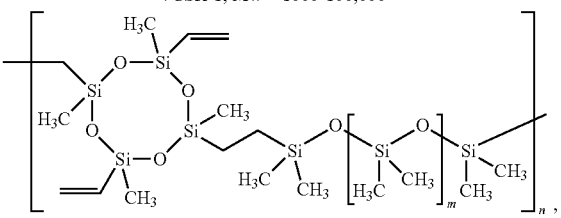

VCSR-2, Mw = 1000-150,000 and

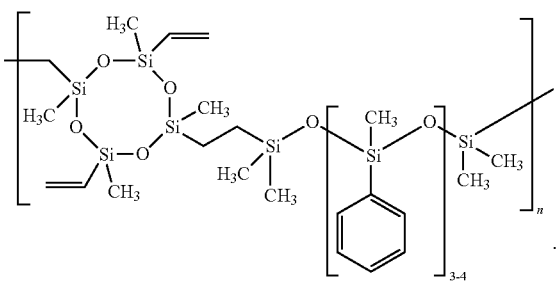

VCSR-3, Mw = 1000-100,000

* * * * *

UNITED STATES PATENT AND TRADEMARK OFFICE
CERTIFICATE OF CORRECTION

PATENT NO. : 9,850,409 B2
APPLICATION NO. : 14/940291
DATED : December 26, 2017
INVENTOR(S) : Zhang et al.

Page 1 of 1

It is certified that error appears in the above-identified patent and that said Letters Patent is hereby corrected as shown below:

In the Specification

Column 4, Line 30: Change "am-vinyl" to -- α, ω-vinyl --.

Signed and Sealed this
Twenty-fourth Day of July, 2018

Andrei Iancu
*Director of the United States Patent and Trademark Office*